June 8, 1965

N. L. KUSTERS ETAL 3,188,562

PLURAL MAGNETIC CORE AND MULTIPLE WINDING CURRENT
COMPARATOR DEVICE WITH OUTER WINDING MEANS
FOR PASSING ERROR CURRENT THERETHROUGH

Filed Dec. 18, 1962

Inventors
Norbert L. Kusters
William J. M. Moore
By Cushman, Darby & Cushman
Attorneys

United States Patent Office 3,188,562
Patented June 8, 1965

3,188,562
PLURAL MAGNETIC CORE AND MULTIPLE WINDING CURRENT COMPARATOR DEVICE WITH OUTER WINDING MEANS FOR PASSING ERROR CURRENT THERETHROUGH
Norbert L. Kusters and William J. M. Moore, Ottawa, Ontario, Canada, assignors to National Research Council, Ottawa, Ontario, Canada, a corporation of Canada
Filed Dec. 18, 1962, Ser. No. 245,474
7 Claims. (Cl. 324—55)

This invention relates to an improved device for comparing alternating electric currents, and, in particular, is concerned with improvements in a current comparator of the type which consists of a pair of windings mounted on a toroidal or other magnetic core closed on itself to form an endless magnetic circuit, said windings being so connected as to generate magnetizing forces opposing each other. When the currents are equal (assuming the windings have an equal number of turns), or more accurately, when the ampere-turns are equal (since the number of turns need not necessarily be equal), there will be zero flux in the core. A third, detection winding is connected to a suitable null indicator to show when balance has been achieved.

In some current comparators, a fourth winding known as the deviation winding is provided, this winding having injected into it from a suitably controlled source a current required to effect perfect balance. For example, whenever there is a phase difference between the currents in the two main windings, some quadrature current will be required for balance, and this can be supplied through the deviation winding.

The present invention contemplates a current comparator that is furnished with the two main outer windings (which for convenience will be referred to in the specific description which follows as the primary and the secondary windings); the detection winding; a deviation winding, as an optional feature; and an additional excitation winding structure. The excitation winding structure is divided into two parts, such parts being positioned on opposite sides (radially) of a second magnetic core that extends parallel to and preferably coaxially around the principal (inner) magnetic core and is also closed on itself to form an endless magnetic circuit. The two parts of the excitation winding structure which are respectively internal and external to the second core are so connected (for example, series opposition) as to generate equal and opposite fluxes, and hence no net flux, within the main, inner core which they both surround. They thus have no effect on the detection winding. However, the second core is mounted within only the external part of the excitation winding structure and consequently it has a flux set up in it, which flux cuts the primary and secondary windings. In one form of the invention one or other of the primary and secondary windings is used as the external part of the excitation winding structure. In another form, separate windings are used.

As will appear more fully from the description that follows this excitation effect can be employed either to induce a desired voltage in the primary or secondary winding, or to cause power transfer in transformer fashion between the primary and second windings, such effect being achieved without interfering with the proper comparator operation of these windings in relation to the detection and deviation windings.

The invention is also directed to circuits employing such a current comparator device and to methods of testing current transformers using such circuits.

An important advantage of the application of the present invention to current transformer testing is the ability which it furnishes to calibrate a transformer in situ, since no heavy equipment is required.

In further illustration of these features of the invention, the accompanying drawings show two constructional examples of a comparator device, and three circuits in which advantage can be taken of the operation of such device. It is to be understood that these illustrations are provided by way of example only, that the comparator device may take other forms and that its operational features may be made use of in other applications and circuits, the scope of the invention being limited only by the appended claims.

Figure 1:
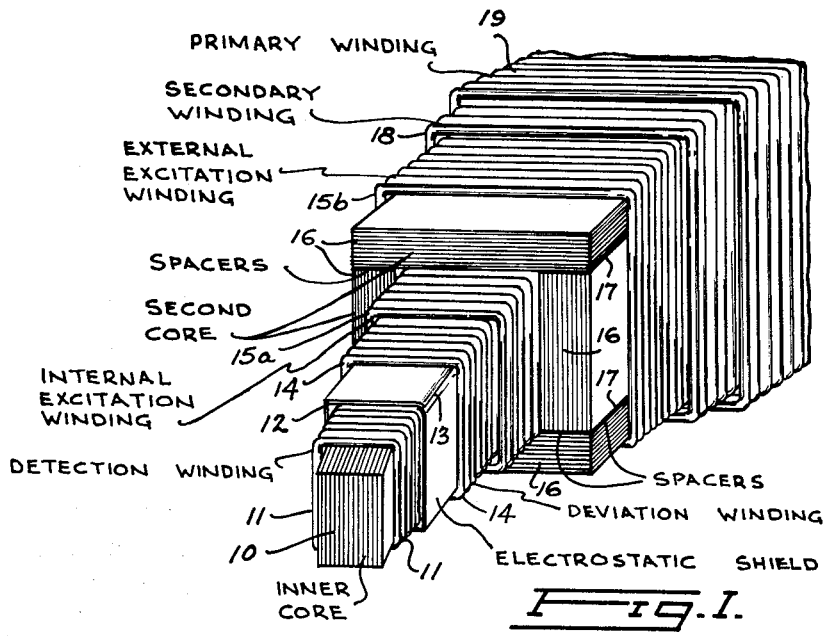
FIGURE 1 shows a diagrammatic cross-section of a current comparator device according to the invention.

The comparator device shown in FIGURE 1 is toroidal in form and each of the windings shown is assumed to extend therearound. At the axial centre of the device is the primary magnetic core 10. In place around the core 10 is a detection winding 11, which will thus indicate flux in the core 10. Radially outwardly again there may conveniently be provided a copper electrostatic shield 12 split along edge 13 in the usual way to avoid a shorted turn. This shield 12 protects the detection winding 11 from interference from stray electric fields.

A deviation winding 14 is in next position. This winding has been illustrated, since it is provided in the preferred form of the invention and is normally necessary, if full balance is to be achieved. It is not, however, fundamental to the inventive advance in its broadest form.

Over the deviation winding, there is placed a first part 15a (known as the internal part) of an excitation winding. Then, radially outwardly of winding 15a, there is mounted in the assembly a second magnetic laminated core 16. This core 16, which also performs the function of a magnetic shield for the detection winding within it, has been shown as made up of four sets of laminations, arranged one set against each of the four faces of the assembly. To prevent a shorted turn, at least one spacer 17 is employed. Like core 10, core 16 is closed on itself to complete an endless magnetic circuit.

Immediately outside the core 16, there is placed the second, external part 15b of the excitation winding. The winding parts 15a and 15b have an equal number of turns and are connected in series opposition.

Radially outwardly of the winding part 15b, are positioned the two main windings, secondary 18 and primary 19. In practice, more than two such main windings may be needed, in which case they will all be placed in this outer position. The primary and secondary windings are interchangeable with each other and are merely so labelled for convenience.

In practice, additional shielding may be provided, as found desirable. Such features have been omitted from the drawing, since the present description is concerned with the fundamental principles of operation rather than with practical constructional considerations.

Since the two parts 15a and 15b of the excitation winding are connected in series opposition, their flux generating effects on the primary core 10 (which is situated within both such winding parts) cancel one another out. Hence the excitation winding produces no flux in core 10. But the second core 16 is unaffected by current in winding part 15a which it is positioned radially beyond, and consequently flux is generated in core 16 by the unopposed external part 15b of the excitation winding. This flux has no effect on the detection winding 11 which lies wholly radially inwardly of core 16, but it does induce voltages in the primary and secondary windings 19 and 18 which surround the core 16.

The device, as a whole, can thus be considered as being two devices at one and the same time. It is first a comparator, as between the oppositely connected primary and secondary windings and the detection winding, using inner core 10 as the magnetic circuit. It is also a transformer as between the primary and secondary windings, using the second core 16 as the magnetic circuit, when excited by the external part of the excitation winding, the detection winding being entirely insensitive to this function.

Figure 2:
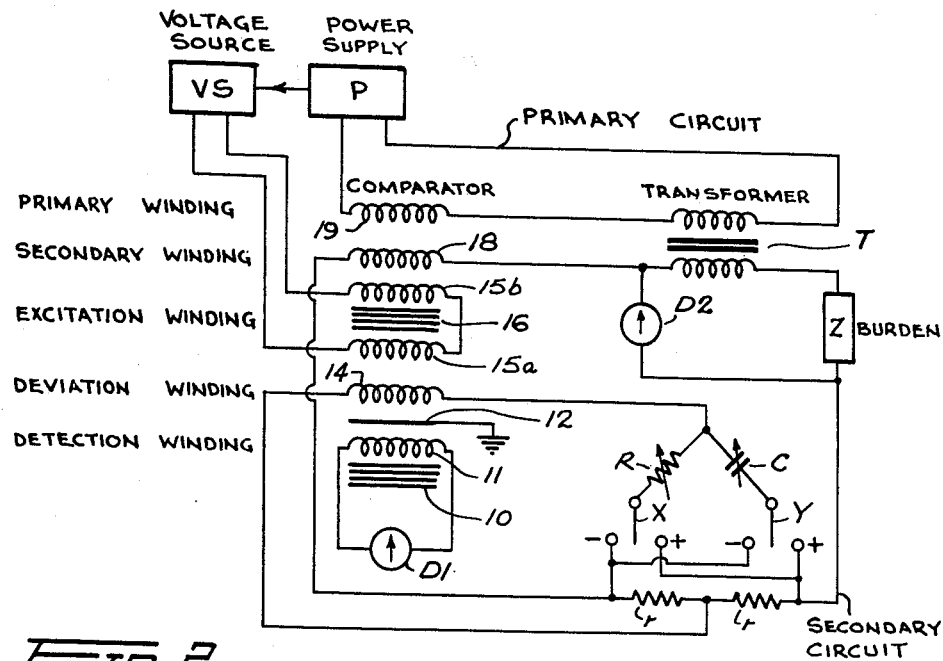
FIGURE 2 is a first circuit providing an example of a use for such device.

A particularly convenient use of such a dual function device is illustrated in FIGURE 2, which shows the device employed for the calibration of a current transformer. Current transformer T (assumed for simplicity to have a nominal 1 to 1 ratio) is under test, and its primary is connected in series with primary winding 19 of the comparator device. Current is supplied from power supply P. Secondary winding 18 of the comparator device is series connected with the secondary of transformer T and a standard burden Z. With equal and opposite currents in windings 18 and 19, the null detector D1 connected to detection winding 11 should show no reading. In practice it will show a small reading, because of the error in transformer T that is to be calibrated. A correcting flux is supplied to the core 10 by means of an error current injected into the device by way of deviation winding 14. This error current has an in-phase component adjusted by variable resistor R, and a quadrature component adjusted by variable capacitor C. These components of the error current are made to be related in magnitude and phase to the current in the secondary circuit by being derived from voltage across resistors r in the secondary circuit. The required sign is determined by switches X and Y.

If the parts of which the function has so far been described were the only components present, a calibration could be obtained, but disadvantages would accrue in accuracy or convenience of measurement by reason of the effect of the impedance of the components added to the burden Z (winding 18 and resistors r) in the transformer secondary circuit.

This disadvantage can be overcome by use of the excitation winding (15a, 15b). This excitation winding is energised from an adjustable voltage source VS, adjustable, that is, in magnitude and phase in relation to the primary current supplied by power supply P and hence the current in the secondary circuit. In addition, a further null detector D2 is connected between the point common to the transformer and comparator secondaries and the point common to the burden Z and resistors r. When the excitation current has been adjusted to give no reading on detector D2 it means that there is now no net voltage drop in the secondary circuit across winding 18 and resistors r, and these components consequently represent no impedance in the secondary circuit. These conditions are thus equivalent to the secondary of transformer T being connected directly across the burden Z, the ideal condition.

The manner in which balance of detector D2 is achieved is to so adjust the supply to the excitation winding that it induces in the secondary winding 18 of the comparator a voltage equal and opposite to the voltage that would otherwise appear across detector D2 from the voltage drop in winding 18 and resistors r due to the current in the secondary circuit. Once this balance has been achieved, the detector D1 is also brought to a null by adjustment of the values of resistor R and capacitor C, which compo- nents can be made to give a direct reading of the in-phase and quadrature errors of the transformer T under calibration.

Figure 3:
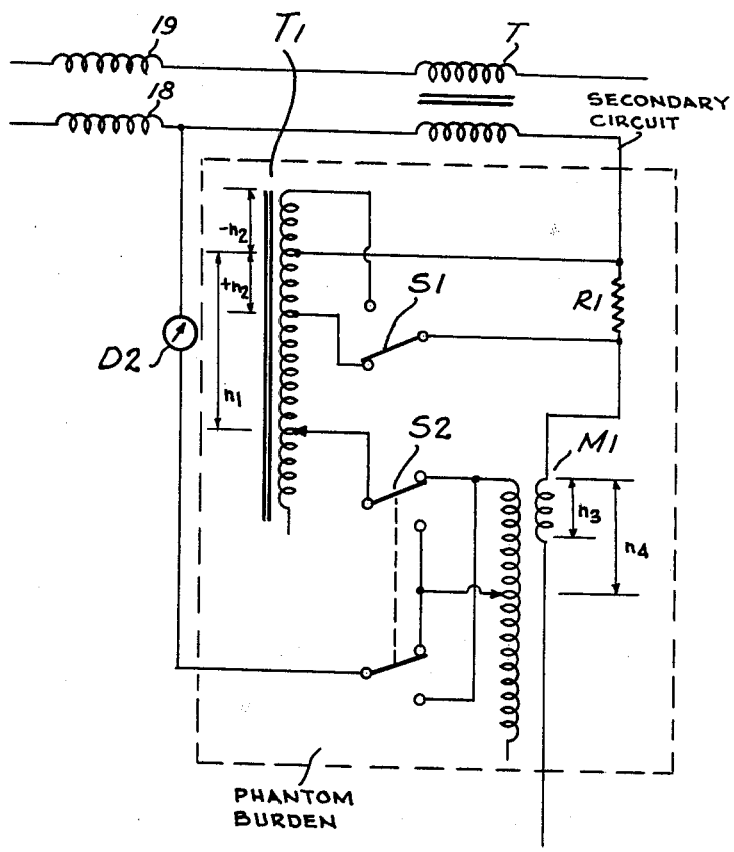
FIGURE 3 is a fragment of FIGURE 2 showing a modification.

A further advantage of this method of operation lies in its permitting the use of a phantom burden in lieu of an actual burden. A phantom burden is simpler and cheaper, and dissipates far less power than a real burden. It also provides a four quadrant burden (including a negative resistance) which cannot otherwise be realised. FIGURE 3 illustrates by means of a fragment of FIGURE 2 such a phantom burden arrangement, the remainder of the circuit being assumed to be the same as that of FIGURE 2. The phantom burden consists of a resistor R1 across which is connected a portion of the coil ($n2$ turns) of an autotransformer T1, the polarity of such connection being reversible by a single pole, double throw switch S1. A mutual inductor M1 has a first winding ($n3$ turns) in series with resistor R1 and a second winding connected at one end to a tap on transformer T1. Detector D2 is connected between a tap on the second winding of inductor M1 and the point common to winding 18 and the secondary of transformer T. The polarity of the latter connection is also reversible by a second, double pole, double throw switch S2.

This circuit is used in the same manner as before, excitation of the excitation winding being adjusted to bring detector D2 to a null. Under these conditions the voltage across the secondary of transformer T is the same as it would be if said secondary were connected across the actual impedance which the phantom burden is simulating. This simulated burden consists of a resistive component equal to $\pm R1 \times$ turns ratio on transformer $T1(n1/n2)$ where $n1$ is the number of turns tapped off by the tap on transformer T1, and a series connected inductive component equal to $\pm j\omega M$, where M is variable and is the mutual inductance between turns $n3$ and $n4$, where $n4$ is the number of turns tapped off by the tap on the second winding of inductor M1.

Figure 4:
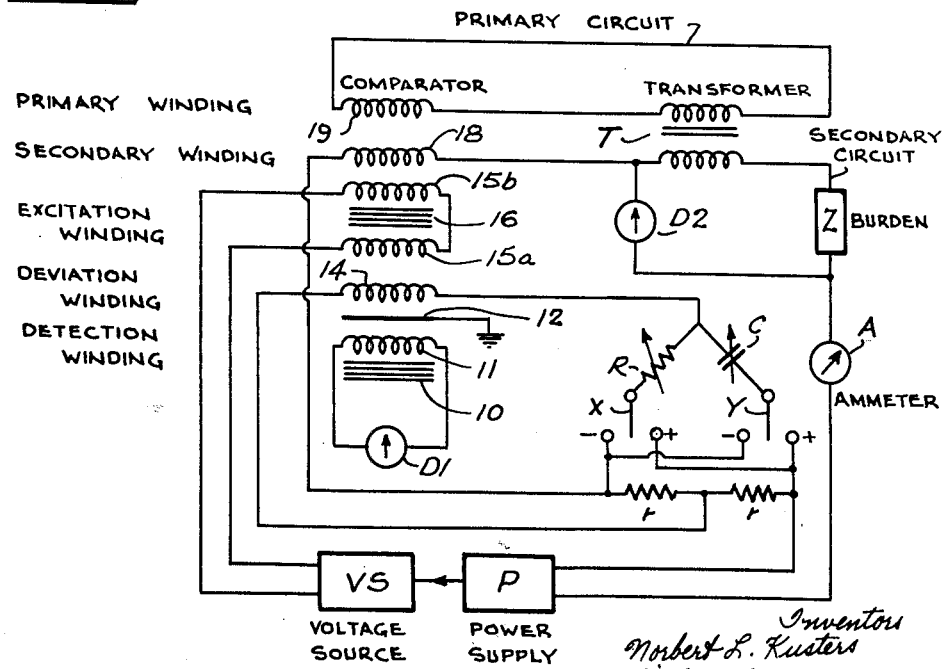
FIGURE 4 is a second circuit providing a further example of a use for the device.

A modification to the circuit of FIGURE 2 is illustrated in FIGURE 4 and demonstrates the transformer-like function of the outer windings of the comparator. In this circuit, the primary circuit has been short circuited on itself; and power has been supplied to the secondary circuit. As in the case of the outer windings, designation of these circuits as primary and secondary is merely a convenience of labelling. The excitation winding, as before, is energised from a voltage course VS adjustable in magnitude and phase in relation to the secondary current.

An ammeter A in the secondary circuit is used first to determine when a suitable chosen current value has been achieved, by adjustment of the current source. The excitation winding supply is then adjusted. Under these conditions the primary and secondary windings of the comparator device act as a power transformer, feeding from the secondary winding 18 to the primary winding 19 to set up a current in the closed primary loop. The power transfer that can be effected in this way is large in comparison with the power that must be supplied to the excitation winding to make the transfer possible. This circuit is also capable of operating with a phantom burden in a like manner to FIGURE 2 as modified by FIGURE 3.

When the correct excitation conditions prevail, detector D2 will show a null, and then detector D1 can be brought to a null by adjustment of resistor R and capacitor C as before, the windings 18 and 19 simultaneously acting as opposed comparator windings in conjunction with core 10 at the same time as they act as transformer windings with core 16.

Figure 6:
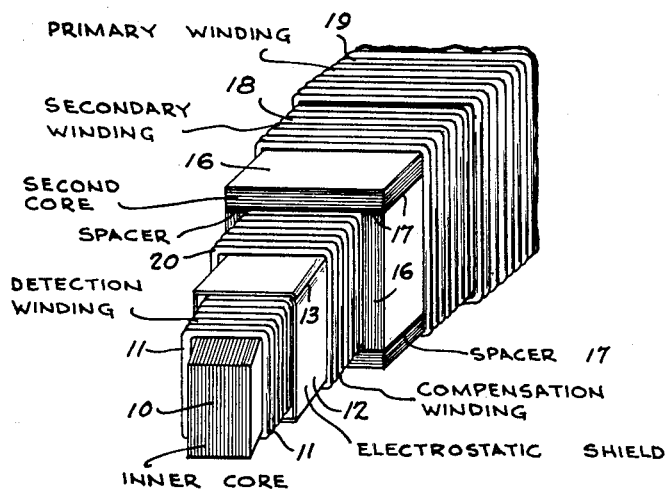
FIGURE 6 is a cross-section of the device used in FIGURE 5.
Figure 5:
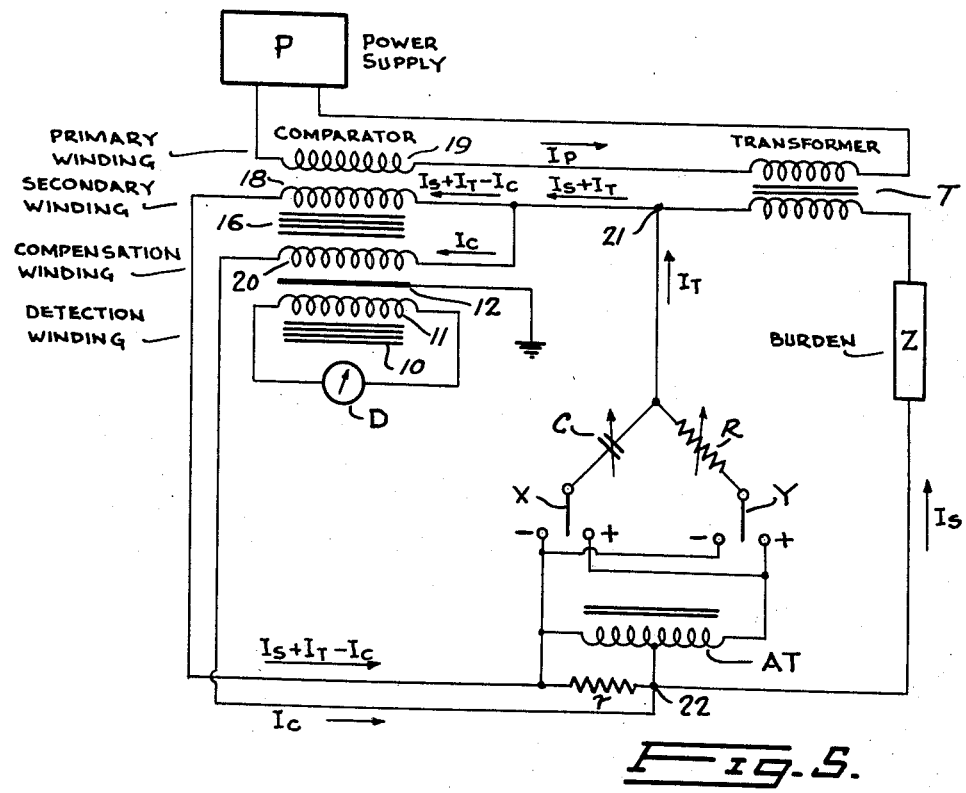
FIGURE 5 is a further circuit providing an example of use of a modified current comparator device.

FIGURE 5 demonstrates a manner in which the secondary winding 18 can be employed to perform a dual function. As well as its own normal function as a secondary winding in the manner already described, winding 18 can be made to take on the function previously performed by the external excitation winding part 15b. FIGURES 5 and 6 show a modified current comparator device according to the present invention in which the winding part 15b has been omitted, and the internal excitation winding part 15a and the deviation winding 14 have been replaced by a compensation winding 20. Since the winding 20 cooperates with the secondary winding 18 to excite the second, shielding core 16 without generating flux in the inner core 10, the number of turns in the two windings (18 and 20) must be equal to one another.

Primary current $I_P$ generates a secondary current $I_S$ in the current transformer T under test. For convenience of understanding, assume a nominal one to one ratio, to that $I_P = I_S$, ignoring the transformer error. In practice, the current transformer has an error represented by a transformer error current $I_T$, so that, in fact $I_P = I_S + I_T$. Current $I_T$ is generated by the network of resistor R and capacitor C essentially as before, and current $I_T$ flows as shown in FIGURE 5 so as to be injected into the current comparator device by way of winding 18.

The total current flowing through the secondary winding 18 will be $I_S + I_T - I_C$, where $I_C$ is the compensation current which is required to excite the core 16. Current $I_C$ traverses the compensation winding 20 in the opposite direction to its travel through the secondary winding 18. As a result it is not seen by the detection winding 11 or by detector D.

The aim of this circuit is basically the same as that of the circuits of FIGURES 2 and 4, namely to avoid as far as possible the addition of any effective impedance to the burden Z in the secondary circuit of the transformer T under test. This is accomplished by bringing to zero, or almost to zero, the potential between points 21 and 22. The extent to which this potential will not be zero will depend on the impedance of the compensation winding 20 and the size of the compensation current $I_C$. These can both be made sufficiently small that the loss of accuracy resulting from the use of this circuit can be made negligible for most practical purposes. The winding 20 will be made of heavy gauge wire. The value of current $I_C$ will depend on the magnetization required by shielding core 16 and this in turn will depend on the load that it must support.

The resistance-capacitance network for generating this error current $I_T$ differs from that of FIGURES 2 and 4, in that only one resistor $r$ is used, a center point being achieved with an auto-transformer AT. This arrangement avoids having the impedance of a second resistor on the side of point 22 on which the burden Z lies.

If preferred, the transformer error current $I_T$ may be injected into the system through a deviation winding similar to the deviation winding 14 of FIGURES 1 to 4.

The alternative of FIGURE 4, namely supplying the secondary circuit from an external source, is equally applicable to FIGURE 5.

We claim:
1. The combination of
   (a) a primary circuit and a secondary circuit, the currents in which are to be compared,
   (b) a current comparator device comprising
      (i) an inner magnetic core closed on itself to form a magnetic circuit,
      (ii) a detection winding around said core,
      (iii) a second magnetic core closed on itself to form a magnetic circuit, said second core extending coaxially with the inner core and being positioned radially outwardly of said detection winding,
      (iv) two outer windings extending around both said cores,
      (v) and a further winding positioned radially between said cores,
      (vi) said further winding having the same number of turns as a selected one of said outer windings,
   (c) means connected to said detection winding for detecting zero output therefrom,
   (d) means connecting said outer windings respectively in said primary and secondary circuits, with said selected outer winding in the secondary circuit,
   (e) means connecting said further winding in series opposition with said selected outer winding,
   (f) means for exciting said serially connected windings whereby to generate no flux in said inner core while generating flux in said second core and inducing a voltage in each of the outer windings,
   (g) means for producing an error current including means for controlling the magnitude and phase of such error current in relation to the current in said secondary circuit,
   (h) and means for injecting said error current into said device comprising means for passing said error current through said selected outer winding.

2. The combination of claim 1, wherein
   (a) said device includes a further deviation winding extending around said inner core,
   (b) and said means for injecting said error current into said device comprises means for passing said error current through said deviation winding.

3. The combination of claim 1 including
   (a) a current transformer,
   (b) means series connecting the primary and secondary windings of said current transformer respectively in said primary and said secondary circuits,
   (c) and a power supply connected to said primary circuit for transfer of current to said secondary circuit through said current transformer.

4. The combination of claim 1 including
   (a) a current transformer,
   (b) means series connecting the primary and secondary windings of said current transformer respectively in said primary and secondary circuits,
   (c) and a power supply connected to said secondary circuit for transfer of current to said primary circuit from the secondary winding of the current comparator device to the primary winding of the current comparator device.

5. Means for testing a current transformer comprising
   (a) a current comparator device comprising
      (i) an inner magnetic core closed on itself to form a magnetic circuit,
      (ii) a detection winding around said core,
      (iii) a second magnetic core closed on itself to form a magnetic circuit, said second core extending coaxially with the inner core and being positioned radially outwardly of said detection winding,
      (iv) two outer windings extending around both said cores,
      (v) and a further winding positioned radially between said cores,
      (vi) said further winding having the same number of turns as a selected one of said outer windings,
   (b) means connecting the primary winding of the current transformer in series with the outer winding other than the said selected winding to form a primary circuit,
   (c) means connecting the secondary winding of the current transformer in series with said selected outer winding to form a secondary circuit,
   (d) means series connecting a burden in said secondary circuit immediately adjacent the secondary winding of the current transformer,
   (e) means connecting said further winding directly across the series connection of burden and current transformer in such a manner as to connect said further winding in series opposition with such selected winding,
   (f) means for detecting the voltage induced in the detection winding,
   (g) means for deriving in-phase and quadrature current components proportional to the current in the secondary circuit from the voltage drop across an impedance in the secondary circuit, (h) means for adding such current components to the secondary current of the current transformer, (i) and means adjusting such components to bring to zero the voltage detected in the detection winding.

6. Means according to claim 5, including means for supplying power from an external source to the primary circuit for transferral to the secondary circuit through the current transformer.

7. Means according to claim 5, including means for supplying power from an external source to the secondary circuit for transferral to the primary winding of the current comparator device in the primary circuit from the secondary winding of the current comparator device.

No references cited.

WALTER L. CARLSON, *Primary Examiner*.